June 23, 1925.

E. J. ARMSTRONG 1,542,982

POWER EXCAVATING MACHINE AND METHOD OF ACTUATING THE SAME

Filed Feb. 26, 1923   3 Sheets-Sheet 2

Inventor
Edwin J. Armstrong
by
Attorney

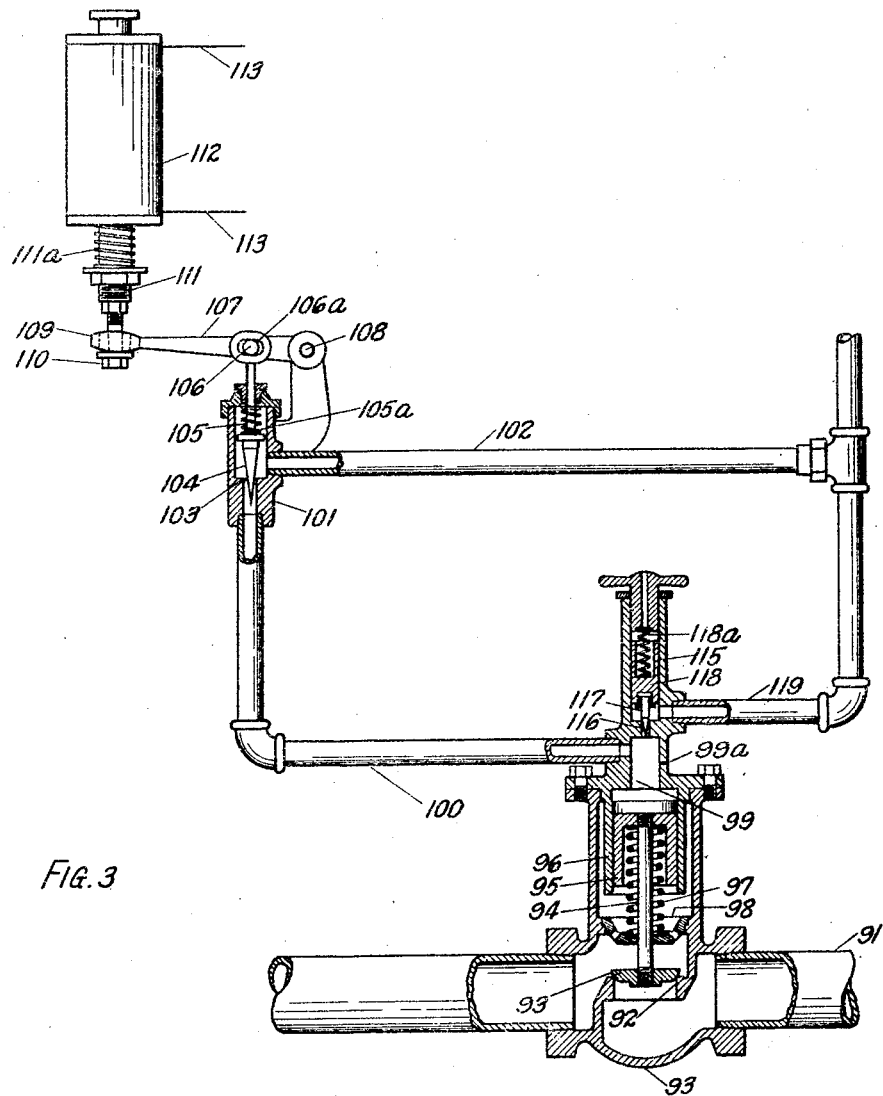

Patented June 23, 1925.

1,542,982

UNITED STATES PATENT OFFICE.

EDWIN J. ARMSTRONG, OF ERIE, PENNSYLVANIA, ASSIGNOR, BY DIRECT AND MESNE ASSIGNMENTS, TO ERIE STEAM SHOVEL COMPANY, OF ERIE, PENNSYLVANIA, A CORPORATION OF PENNSYLVANIA.

POWER EXCAVATING MACHINE AND METHOD OF ACTUATING THE SAME.

Application filed February 26, 1923. Serial No. 621,337.

*To all whom it may concern:*

Be it known that I, EDWIN J. ARMSTRONG, a citizen of the United States, residing at Erie, in the county of Erie and State of Pennsylvania, have invented new and useful Improvements in Power Excavating Machines and Methods of Actuating the Same, of which the following is a specification.

Power excavating devices, particularly shovels and cranes are operated very largely by steam engines. While some of these devices have been actuated by other types of motors it has been difficult to get satisfactory results from such motors due to the failure of such motors to give the proper control and acceleration to the motors used as for instance the turning engine and the crowding engine. These engines do not require a great amount of power in the total and are used but intermittently but in order to get rapid operation of the machine must have great acceleration and be subject to very nice control. Fluid actuated engines satisfy this requirement perfectly. In the present invention I utilize an electric motor and use it directly for operating on the digging implement and indirectly for otherwise actuating the implement. Preferably the motor is used directly on the hoist as this has a more extended operation and can be used more satisfactorily with the direct connection. In carrying forward the invention I preferably compress air by a compressor driven from the motor and use this compressed air for driving the crowding and turning engines. Preferably I relieve the motor of the load of the compressor during the peak load in hoisting. In this way a comparatively small motor may be used and its full energy is constantly employed. Features and details of the invention will appear from the specification and claims.

The apparatus forming the subject matter of the invention by which the method may be carried out is illustrated in the accompanying drawings as follows:—

Figure 1:
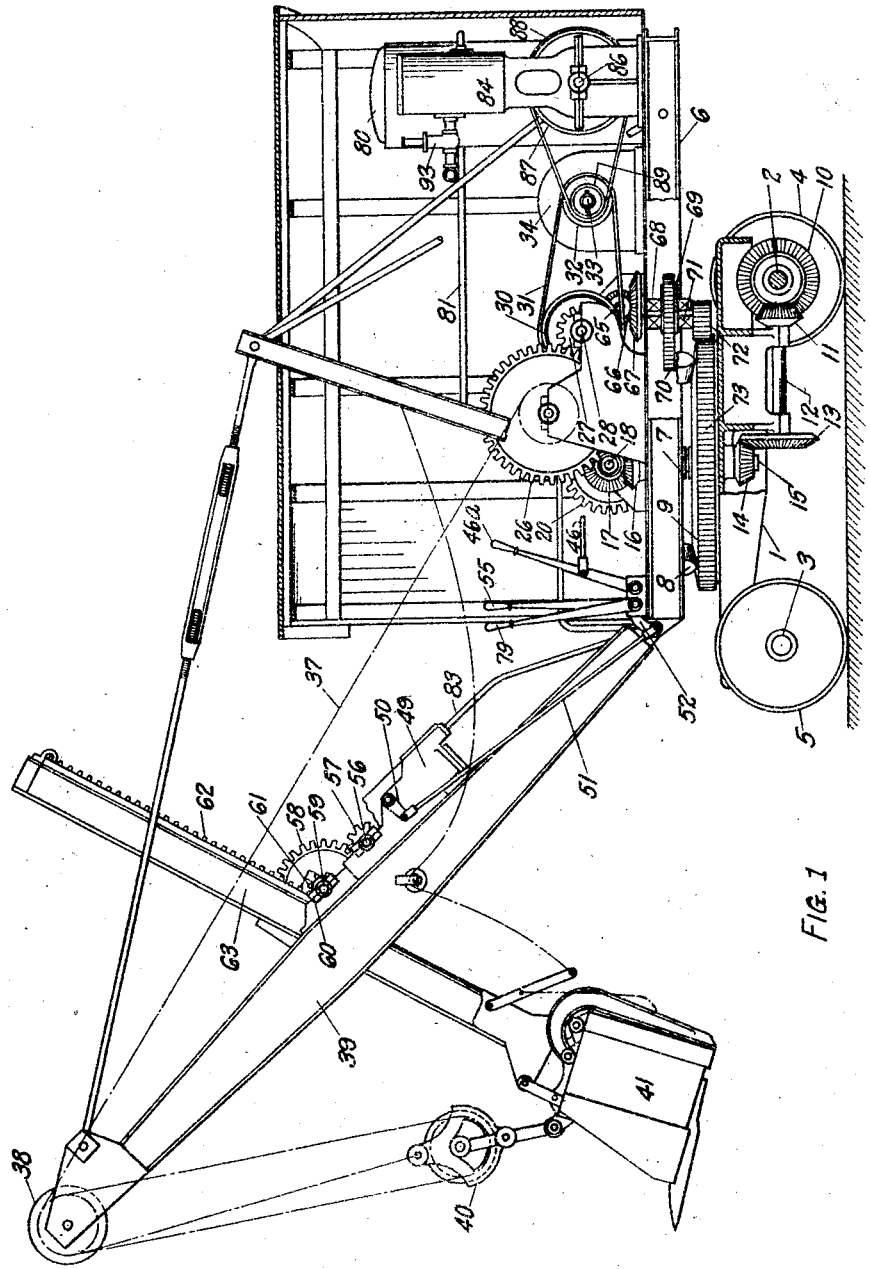

Fig. 1 shows a side elevation of a power shovel.

Figure 2:
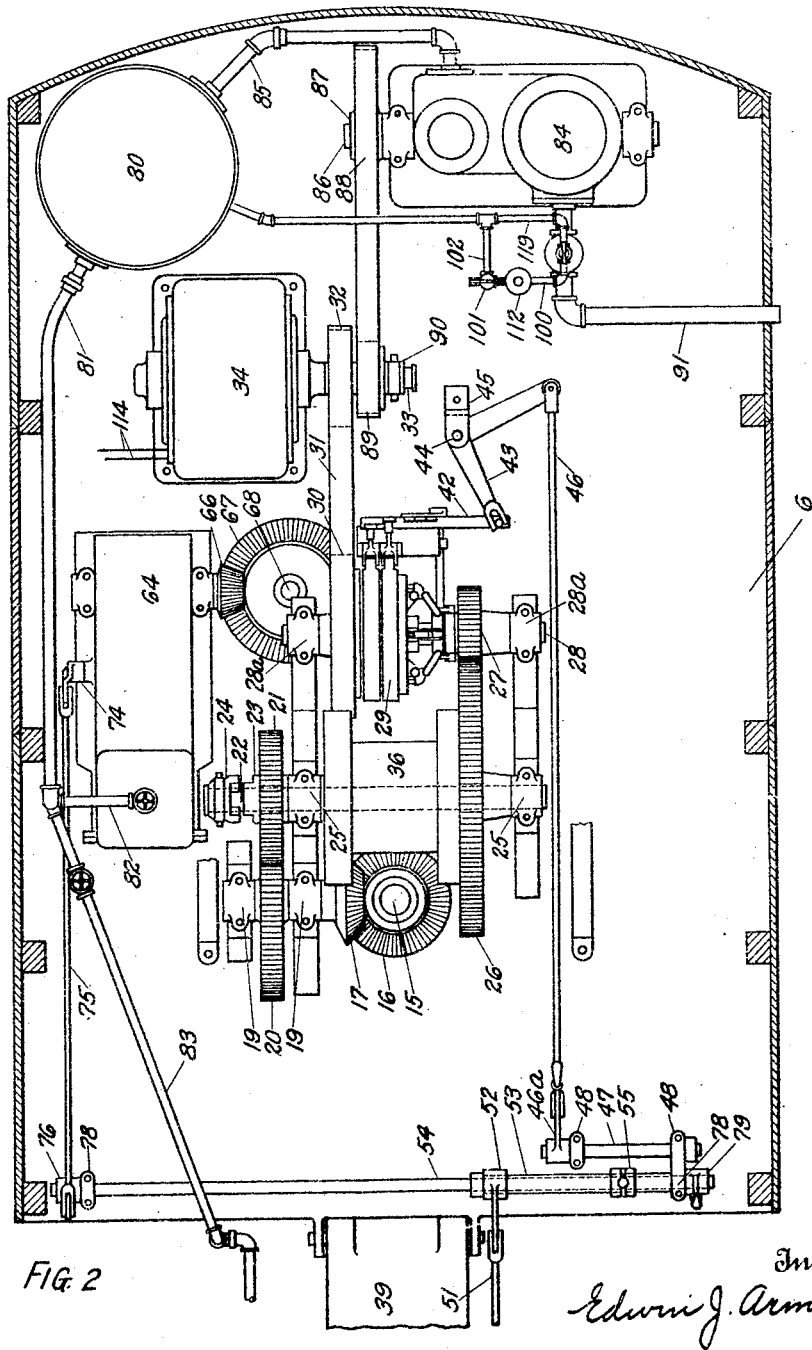

Fig. 2 a plan view of the operating platform.

Fig. 3 an enlarged view of the controlling device for the compressor.

1 marks the frame, 2 the rear driving axle, 3 the steering axle, 4 the drive wheels, 5 the wheels on the steering axle, 6 the swinging platform, 7 a pivotal mounting of the platform, 8 rollers carrying the platform, 9 a circular track on which the rollers operate, 10 a driving gear on the drive shaft 2, 11 a pinion meshing with the gear 10, 12 a shaft on which the gear 11 is fixed, 13 a beveled gear on the shaft 12 meshing with a pinion 14, 15 an upright shaft having its axis coincident with the pivotal mounting of the frame, 16 a beveled gear on the upper end of the shaft 15, 17 a gear meshing with the gear 16, 18 a shaft on which the gear 17 is mounted, 19—19 bearings in which the shaft 18 is journaled, 20 a gear fixed on the shaft 18, 21 a gear meshing with the gear 20, said gear being journaled on a drum shaft 22, 23 and 24 clutch elements adapted to lock the gear 21 with the shaft 22, 25 bearings for the shaft 22, and 26 a drum gear on the opposite end of the shaft 22. These parts are, or may be, of ordinary construction.

The gear 26 is driven by a gear 27. The gear 27 is mounted on a shaft 28 carried in bearings 28$^a$. A clutch and speed changing device 29 is mounted on the shaft 28 and the shaft is driven through this speed changing device from a pulley 30. The pulley 30 is driven by a belt 31 extending from a pulley 32 on the rotor shaft 33 of an electric motor 34. The usual hoisting drum 36 is mounted on the shaft 22 and a hoisting line 37 runs from this drum over sheaves 38 at the end of a boom 39. The line is carried through a pulley block 40 which is attached to the shovel 41. The clutch and speed changing device is controlled by a sliding bar 42. This is actuated by a bell crank lever 43. The bell crank lever is pivoted on a pin 44 carried in a bracket 45 on the platform. A link 46 extends from the bell crank lever to an operating handle 46$^a$. The operating handle 46$^a$ is mounted on a shaft 47. The shaft 47 is journaled in bearings 48, the bearings being mounted in the platform. This operating handle is in convenient position for the operator standing in the usual operating position on the platform. A crowding engine 49 is mounted on the boom and has the usual valve controlling lever 50.

A link 51 connects the control lever 50 with a rock arm 52. The rock arm 52 is carried by a sleeve 53 mounted on a shaft 54. An actuating or controlling lever 55 extends upwardly from the sleeve 53 in position to be conveniently operated by the operator standing in the operating position on the platform. A crank shaft 56 of the crowding engine carries a pinion 57. The pinion 57 meshes with a gear 58. The gear 58 is fixed on a shaft 59 and the shaft 59 is journaled in bearings 60. The bearing 60 is mounted on the boom. A gear 61 is fixed on the shaft 59 and meshes with a rack 62 on a dipper stick 63. The crowding engine operates on the dipper stick and in relation to the hoisting line in the usual manner.

A turning engine 64 is mounted on the platform. It is provided with a crank shaft 65 on which is mounted the bevelled pinion 66. The pinion 66 meshes with a gear 67. The gear 67 is fixed on a vertical shaft 68. A gear 69 is fixed on the shaft 68 and meshes with a gear 70. The gear 70 is mounted on a shaft 71. A pinion 72 is fixed on the shaft 71 and meshes with a gear 73 surrounding the circular track 9 in the usual manner. The turning engine operates through this gearing in the usual manner, the pinion 72 turning on the gear 73 swinging the platform. A controlling lever 74 controls the turning engine in the usual way. A rod 75 extends from the lever 74 to a rock arm 76. The rock arm is carried by a shaft 54 and the shaft 54 is mounted in bearings 78 on the platform. A controlling lever 79 is fixed on the shaft 54 in position to be conveniently handled by the operator standing in the operating position on the platform.

A receiver 80 is mounted on the platform and has a pipe 81 extending from it. A pipe 82 leads from the pipe 81 to the turning engine, this turning engine being fluid actuated and operated by compressed air. A pipe 83 extends from the pipe 81 to the crowding engine, the crowding engine being fluid actuated and operated by compressed air through this supply pipe.

A compressor 84 is mounted on the platform and has its discharge pipe 85 connected with the receiver. A drive shaft 86 of the compressor has a drive pulley 87. A belt 88 extends from the drive pulley 87 to a pulley 89 on the rotor shaft 33. A clutch 90 is provided by means of which the compressor may be thrown into or out of driving relation. The compressor is provided with an inlet pipe 91.

It is desirable to unload the compressor whenever the motor is subjected to full load in the hoisting operation so that the full power of the motor may be delivered to the hoist and as soon as the motor is relieved of the hoisting load the unloader should be actuated to throw the load on the compressor so that the motor during the interval that it is relieved from the hoisting load may store up energy through the compressor in the receiver for the operation of the crowding and turning engines. In this way the motor may be subjected to a fairly continuous load and in as much as the load on the different instrumentalities is not continuous and the motor supplies the energy to these successively a comparatively small motor may be used.

An inlet unloader is used, an unloader valve 93 being arranged in the intake pipe. It has a valve seat 92 on which operates the unloader valve 93. A stem 94 extends from the valve 93 to a piston 95. The piston 95 is arranged in a cylinder 96. A spring 97 operates against the piston 95 and rests on a perforated disc 98. The spring tends to open the valve. The pressure on the piston 95 tends to close it but upon the closing of the valve the admission of the air to the compressor is cut off and the compressor is thus unloaded. The cylinder 96 communicates with a chamber 99 and this chamber communicates through a pipe 100 with a controlling valve 101. Air is delivered to the control valve through a pipe 102 leading from the receiver. The control valve has a seat 103 on which operates a needle valve 104. A stem 105 extends upwardly from the needle valve and a spring $105^a$ tends to close it. A trunnion 106 at the upper end of the stem 105 extends into a slot $106^a$ on a lever 107. The lever 107 is pivoted on a pin 108 and has a forked end 109 which rests on a collar 110. The collar 110 is mounted on a core 111 of a solenoid 112. The solenoid is energized through the wires 113 which wires are connected with supply wires 114 leading to the motor. When the motor is laboring under a load the added current is carried through the solenoid and the core is thus actuated against the spring $105^a$ and a spring $111^a$, thus opening the valve 104 and permitting air to pass to the chamber 99 and cylinder 96. This air pressure closes the valve 93 and unloads the compressor. As soon as the load on the motor is relieved the pull on the core is reduced and the springs close the valve 104 and the compressor immediately loads up.

In order that the compressor may be unloaded when the pressure in the receiver reaches a pre-determined point the unloader valve is also controlled by this pressure. A passage 116 leads to the chamber 99. This is controlled by a valve 117. The valve 117 is carried by a piston 118 operating in a cylinder 115. A pipe 119 leads from the receiver to the cylinder 115. The piston 118 is subjected to the pressure of a spring $118^a$ so that when the pressure is below the pre-determined pressure the valve 117 is held in closed position. When, however the pressure rises above this the spring pressure is overcome opening the valve 117 and delivering air under pressure to the piston 95 so as to close the valve. In order to exhaust the chamber 99 a small leak 99ª is provided.

In the general operation of this device it will be seen the hoisting operation is handled directly by the motor through the clutch mechanism and by the control lever 46ª. The compressor is loaded during the interval in which the motor is relieved of the hoisting load and maintains a pressure in the receiver sufficient to operate the crowding engine and turning engine. These engines are controlled from the levers 79 and 59 in the usual manner and operate as ordinary steam engines in performing their operations.

What I claim as new is:—

1. In a machine, the combination of a plurality of instrumentalities having intermittent and successive operation; a primary electric motor operating directly on one of said instrumentalities; a secondary motor operating on the second of said instrumentalities; and an energy storing means supplied from the primary motor and supplying energy to the secondary motor.

2. In a machine, the combination of a plurality of instrumentalities having intermittent and successive operation; a primary electric motor operating directly on one of said instrumentalities; a secondary motor operating on the second of said instrumentalities; an energy storing means supplied from the primary motor and supplying energy to the secondary motor; and devices for relieving the primary motor from the effort of delivering energy to the energy storing means during a peak load on the instrumentality actuated directly from the primary motor.

3. In a machine, the combination of two instrumentalities operating intermittently and successfully; a primary electric motor directly actuating one of said instrumentalities; a fluid actuated secondary motor actuating the other of said instrumentalities; and a compressor driven by the primary motor and compressing fluid for actuating the secondary motor.

4. In a machine, the combination of two instrumentalities operating intermittently and successively; a primary electric motor directly actuating one of said instrumentalities; a fluid actuated secondary motor actuating the other of said instrumentalities; a compressor driven by the primary motor and compressing fluid for actuating the secondary motor; and means for relieving the primary motor of the load of the compressor during the peak load on the instrumentality actuated directly from the primary motor.

5. In a power excavating machine, the combination of a digging implement; a primary electric motor operating directly on said digging implement; a secondary motor operating on said implement; and energy storing means actuated by the primary motor and delivering energy to the secondary motor.

6. In a power excavating machine, the combination of a digging implement; a primary electric motor operating directly on said digging implement; a secondary motor operating on said implement; energy storing means actuated by the primary motor and delivering energy to the secondary motor; and devices relieving the primary motor of the load of delivering energy to the energy storing means while delivering its peak load directly to the implement.

7. In a power excavating machine, the combination of a digging implement; a primary electric motor acting directly on the implement; a fluid pressure actuated secondary motor acting on the implement; and a compressor compressing fluid for actuating the secondary motor driven by the primary motor.

8. In a power excavating machine, the combination of a digging implement; a primary electric motor acting directly on the implement; a fluid pressure actuated secondary motor acting on the implement; a compressor compressing fluid for actuating the secondary motor driven by the primary motor; and devices relieving the primary motor of the load of the compressor while delivering the peak load directly to the implement.

9. In a power excavating machine, the combination of a digging implement; a hoisting device for the implement; a primary electric motor operating directly on the hoisting device; a secondary motor acting on the implement; and an energy storing means supplied from the primary motor and supplying energy to the secondary motor.

10. In a power excavating machine, the combination of a digging implement; a hoisting device for the implement; a primary electric motor operating directly on the hoisting device; a secondary motor acting on the implement; an energy storing means supplied from the primary motor and supplying energy to the secondary motor; and means for relieving the primary motor of the load of supplying energy to the energy storing means while subjected to the peak load of the hoisting device.

11. In a power excavating machine, the combination of a digging implement; a hoisting device acting on the implement; a primary electric motor driving the hoisting device; a secondary fluid pressure actuated motor acting on the implement; and a compressor driven by the primary motor and supplying fluid for the secondary motor.

12. In a power excavating machine, the combination of a digging implement; a hoisting device acting on the implement; a primary electric motor driving the hoisting device; a secondary fluid pressure actuated motor acting on the implement; a compressor driven by the primary motor and supplying fluid for the secondary motor; and means for relieving the primary motor of the load of the compressor while subjected to the peak load of the hoisting device.

13. In a power excavating machine, the combination of a rotating platform; a fluid pressure actuated turning engine for the platform; a hoist; an electric motor actuating the hoist; and a compressor actuated by the electric motor compressing fluid for the turning engine.

14. In a power excavating machine, the combination of a rotating platform; a fluid pressure actuated turning engine for the platform; a hoist; an electric motor actuating the hoist; a compressor actuated by the electric motor compressing fluid for the turning engine; and means for relieving the electric motor of the load of the compressor while delivering its peak load to the hoist.

15. In a power shovel, the combination of a dipper; a dipper stick; a fluid pressure actuated crowding engine acting on the dipper stick; a hoist; an electric motor directly actuating the hoist; and a compressor driven by the electric motor.

16. In a power shovel, the combination of a dipper; a dipper stick; a fluid pressure actuated crowding engine acting on the dipper stick; a hoist; an electric motor directly actuating the hoist; a compressor driven by the electric motor; and means for relieving the electric motor of the load of the compressor while delivering its peak load to the hoist.

17. In a power shovel, the combination of a dipper; a dipper stick; a fluid pressure actuated crowding engine actuating the dipper stick; a turning platform on which the dipper stick is mounted; a fluid pressure actuated turning engine turning the platform; a hoist; an electric motor actuating the hoist; and a compressor actuated by the electric motor compressing fluid for the crowding and turning engines.

18. In a power shovel, the combination of a dipper; a dipper stick; a fluid pressure actuated crowding engine actuating the dipper stick; a turning platform on which the dipper stick is mounted; a fluid pressure actuated turning engine turning the platform; a hoist; an electric motor actuating the hoist; a compressor actuated by the electric motor compressing fluid for the crowding and turning engines; and means for relieving the electric motor of the load of the compressor while delivering the peak load to the hoist.

19. In a power excavating machine, the combination of a digging implement; a primary electric motor actuating the implement directly; a secondary motor operating on the implement; an energy storing means receiving its energy from the primary motor and delivering the same to the secondary motor; and electrically actuated devices responsive to load variations on the primary motor relieving the primary motor of the load of delivering energy to the energy storing means during the peak load on the primary motor from the implement actuated directly.

20. In a power excavating machine, the combination of a digging implement; a primary electric motor actuating the implement directly; a secondary motor operating on the implement; an energy storing means receiving its energy from the primary motor and delivering the same to the secondary motor; and electrically actuated devices responsive to load variations on the primary motor relieving the primary motor of the load of delivering energy to the energy storing means during the peak load on the primary motor from the implement actuated directly, said devices comprising a solenoid in circuit with the supply circuit of the motor.

21. In a power excavating machine, the combination of a digging implement; an electric motor acting directly on the digging implement; a fluid actuated engine operating on the implement; a compressor operated by the electric motor and delivering fluid to the fluid actuated engine; and electrically actuated controlling devices relieving the electric motor of the load of the compressor when the electric motor is subjected to the peak load from the implement driven directly from the electric motor.

22. In a power excavating machine, the combination of a digging implement; an electric motor acting directly on the digging implement; a fluid actuated engine operating on the implement; a compressor operated by the electric motor and delivering fluid to the fluid actuated engine; and electrically actuated controlling devices relieving the electric motor of the load of the compressor when the electric motor is subjected to the peak load from the implement driven directly from the electric motor comprising a solenoid responding to variations of current on the motor.

23. In a power excavating machine, the combination of a digging implement; an electric motor acting directly on the digging implement; a fluid actuated engine operating on the implement; a compressor operated by the electric motor and delivering fluid to the fluid actuated engine; and electrically actuated controlling devices relieving the electric motor of the load of the compressor when the electric motor is subjected to the peak load from the implement driven directly from the electric motor, said devices comprising an unloader from the compressor.

24. In a power excavating machine, the combination of a digging implement; an electric motor acting directly on the digging implement; a fluid actuated engine operating on the implement; a compressor operated by the electric motor and delivering fluid to the fluid actuated engine; electrically actuated controlling devices relieving the electric motor of the load of the compressor when the electric motor is subjected to the peak load from the implement driven directly from the electric motor, said devices comprising an unloader from the compressor; and an electrical controlling device for the unloader responsive to current variations on the motor.

25. The method of delivering intermittent and successive power impulses to instrumentalities which consists in directly exerting a power impulse from an electric motor, storing energy from the electric motor during intervals in which it is relieved from delivering a direct power impulse, and drawing from the stored energy to deliver impulses to the instrumentality through a secondary motor.

26. The method of actuating a power excavating machine which consists in delivering a power impulse to a digging implement of said machine directly from a primary electric motor, storing energy from the primary motor during intervals in which it is relieved from the load of exerting impulses directly to the digging implement, and delivering the energy so stored to the digging implement through a secondary motor.

27. The method of actuating power excavating machines having a digging instrumentality which consists in delivering energy to the instrumentality directly from a primary electric motor, compressing fluid by energy from the primary motor during intervals in which it is relieved of the peak load through its direct connection with the instrumentality, and operating the instrumentality through a fluid pressure actuated motor from the fluid compressed.

28. The method of actuating power excavating machines having a digging instrumentality which consists in delivering power directly to the instrumentality to hoist the same from a primary electric motor, storing energy from the primary motor during intervals in which the primary motor is relieved of the load of the hoist, and delivering the energy so stored to a turning motor swinging the digging instrumentality.

29. The method of actuating power excavating machines having a digging instrumentality which consists in delivering power directly to the instrumentality to hoist the same from a primary electric motor, storing energy from the primary motor during intervals in which the primary motor is relieved of the load of the hoist, and delivering the energy so stored to a crowding engine operating on the digging instrumentality.

30. The method of actuating power excavating machines having a digging instrumentality which consists in delivering power directly to the instrumentality to hoist the same from a primary electric motor, storing energy from the primary motor during intervals in which the primary motor is relieved of the load of the hoist, and delivering the energy so stored to a crowding and turning engine swinging and crowding the digging instrumentality.

In testimony whereof I have hereunto set my hand.

EDWIN J. ARMSTRONG.